US012581505B2

(12) United States Patent
Matsumura et al.

(10) Patent No.: US 12,581,505 B2
(45) Date of Patent: Mar. 17, 2026

(54) TERMINAL AND RADIO BASE STATION

(71) Applicant: NTT DOCOMO, INC., Tokyo (JP)

(72) Inventors: Yuki Matsumura, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 328 days.

(21) Appl. No.: 18/266,212

(22) PCT Filed: Dec. 11, 2020

(86) PCT No.: PCT/JP2020/046419
§ 371 (c)(1),
(2) Date: Jun. 8, 2023

(87) PCT Pub. No.: WO2022/123793
PCT Pub. Date: Jun. 16, 2022

(65) Prior Publication Data
US 2024/0040585 A1    Feb. 1, 2024

(51) Int. Cl.
*H04W 72/23* (2023.01)
*H04W 72/232* (2023.01)

(52) U.S. Cl.
CPC ................................. *H04W 72/232* (2023.01)

(58) Field of Classification Search
CPC .................................................. H04W 72/232
See application file for complete search history.

(56) References Cited

U.S. PATENT DOCUMENTS

| | | | |
|---|---|---|---|
| 2006/0003769 A1* | 1/2006 | Liu | ................ H04W 36/00837 |
| 2019/0150107 A1* | 5/2019 | Tang | .................. H04W 72/044 |
| 2019/0166557 A1* | 5/2019 | Chen | .................. H03F 3/45179 |
| 2020/0145921 A1 | 5/2020 | Zhang et al. | |
| 2020/0260382 A1 | 8/2020 | Ljung et al. | |
| 2021/0377857 A1* | 12/2021 | Wu | .................. H04W 52/0219 |

FOREIGN PATENT DOCUMENTS

| | | |
|---|---|---|
| JP | 2020-519196 A | 6/2020 |
| WO | 2019/086516 A1 | 5/2019 |

OTHER PUBLICATIONS

International Search Report issued in PCT/JP2020/046419 on Jul. 20, 2021 (2 pages).
Written Opinion of the International Searching Authority issued in PCT/JP2020/046419 on Jul. 20, 2021 (3 pages).
3GPP TS 38.212 V16.3.0; "3rd Generation Partnership Project; Technical Specification Group Radio Access Network; NR; Multiplexing and channel coding (Release 16)"; Sep. 2020 (152 pages).
3GPP TS 38.321 V16.2.1; "3rd Generation Partnership Project; Technical Specification Group Radio Access Network; NR; Medium Access Control (MAC) protocol specification (Release 16)"; Sep. 2020 (154 pages).

* cited by examiner

*Primary Examiner* — Ronald B Abelson
(74) *Attorney, Agent, or Firm* — Osha Bergman Watanabe & Burton LLP

(57)    ABSTRACT
A terminal has a first receiver that receives a first control signal and a second receiver that receives a second control signal or data. The first receiver receives a first control signal that includes at least either information, instruction or control relating to the second control signal or data received by the second receiver.

6 Claims, 12 Drawing Sheets

FIRST CONTROL SIGNAL ←
INFORMATION RELATING TO
RECEPTION OF SECOND RECEIVER
DATA/SECOND CONTROL SIGNAL ←

FIRST CONTROL SIGNAL/
SECOND CONTROL SIGNAL/DATA ←

FIRST CONTROL SIGNAL/
SECOND CONTROL SIGNAL/DATA →

| CONFIGURATION IN THE UPPER LAYER | VALUE |
|---|---|
| START FREQUENCY INDEX | 5 |
| END FREQUENCY INDEX | 7 |

| CONFIGURATION IN THE UPPER LAYER | VALUE |
|---|---|
| SEQUENCE INITIAL INDEX | 3 |

| CONFIGURATION IN THE UPPER LAYER | VALUE |
|---|---|
| START FREQUENCY INDEX | 5 |
| END FREQUENCY INDEX | 7 |

IN CASE OF CELL ID=0

IN CASE OF CELL ID= 10

TERMINAL AND RADIO BASE STATION

TECHNICAL FIELD

The disclosure relates to a terminal that receive control signals and data and to a radio base station that transmit control signals and data.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

In orthogonal frequency division multiplexing (OFDM) prescribed by NR, a terminal (User Equipment, UE) receives a Physical Downlink Control Channel (PDCCH) candidate in a set CORESET (control resource sets)/search space and performs guard interval (GI) removal, Fourier transform (FFT), demodulation, etc., to generate a demodulated received bit sequence. Furthermore, the UE tries a cyclic redundancy checksum (CRC) check at an aggregation level that can demodulate the received bit sequence, and if the CRC check passes, it receives a PDCCH (refer downlink control information (DCI)). Thus, the UE consumes power to monitor the PDCCH candidate.

Therefore, NR defines DRX (Discontinuous Reception) to stop monitoring PDCCH for a certain period of time (Non-Patent Literature 1). Control using Wake-Up Signal is also defined to reduce power consumption in idle mode of UE (Non-Patent Literature 2).

CITATION LIST

Non-Patent Literature

Non-Patent Literature 1: 3GPP TS 38.321 V 16.2.1, 3rd Generation Partnership Project; Technical Specification Group Radio Access Network; NR; Medium Access Control (MAC) protocol specification (Release 16), 3 GPP, September 2020

Non-Patent Literature 2 3GPP TS 38.212 V 16.3.0, 3rd Generation Partnership Project; Technical Specification Group Radio Access Network; NR; Multiplexing and channel coding (Release 16), 3 GPP, October 2020

SUMMARY OF INVENTION

As described above, since OFDM is used in NR, the UE consumes power during the period of monitoring PDCCH regardless of whether it can actually receive PDCCH, even if DRX is applied.

Power consumption can be reduced by monitoring PDCCH for a shorter period of time, i.e., by monitoring PDCCH less frequently, but communication delay (Time difference between when the need for PDCCH transmission occurs at the radio base station and when the UE actually monitors PDCCH) can be increased.

Therefore, the following disclosure has been made in view of these circumstances, and the purpose of the disclosure is to provide a terminal and a radio base station that can further reduce power consumption associated with the reception of control signals such as PDCCH while avoiding an increase in communication delay.

One aspect of the disclosure is a terminal (UE 200) including a first receiver that receives a first control signal, and a second receiver that receives a second control signal or data. The first receiver receives the first control signal including at least either information, instruction or control relating to the second control signal or the data received by the second receiver.

One aspect of the present disclosure is a terminal (UE 200) including a reception unit that receives a first control signal, a second control signal and data, and a control unit that controls reception of the first control signal, the second control signal and the data. The control unit controls reception of the second control signal or the data based on the first control signal including at least either the second control signal, or information, instructions or control relating to the second control signal or the data, and the first control signal and the second control signal differs in at least either of frequency resources or time resources to be used.

One aspect of the disclosure is a radio base station (gNB 100) including a transmission unit that transmits a first control signal to a first receiver of a terminal and a second control signal or data to a second receiver of the terminal, and a control unit that causes the transmission unit to transmit the first control signal including at least either information, instruction or control relating to the second control signal or the data received by the second receiver.

One aspect of the disclosure is a radio base station (gNB 100) including a transmission unit that transmits a first control signal to a first receiver of a terminal and a second control signal or data to a second receiver of the terminal, and a control unit that causes the transmission unit to transmit the first control signal including at least either information, instruction or control relating to the second control signal or the data received by the second receiver. The first control signal and the second control signal differ in at least either of frequency resources or time resources to be used.

MODES FOR CARRYING OUT THE INVENTION

Figure 1:
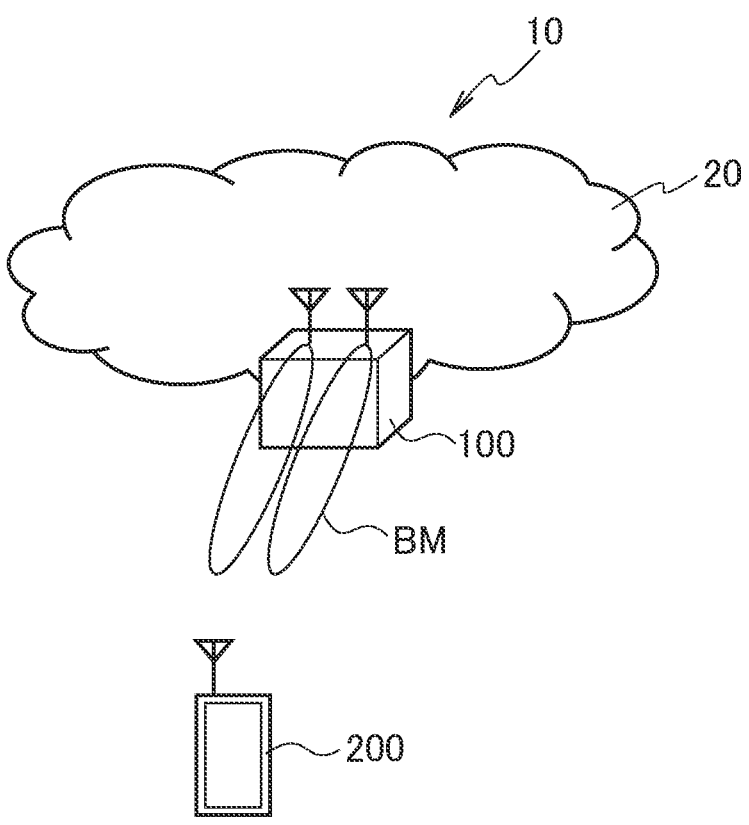
FIG. 1 is an overall schematic configuration diagram of radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic diagram of a radio communication system 10 according to the present embodiment. The radio communication system 10 is a radio communication system according to 5G New Radio (NR) and includes a Next Generation-Radio Access Network 20 (NG-RAN and user terminals 200 (User Equipment 200, below, UE 200).

The radio communication system 10 may be a radio communication system according to a scheme called Beyond 5G Evolution or 6 G.

The NG-RAN 20 includes a radio base station 100 (Below: gNB 100). The specific configuration of radio communication system 10 including the number of gNBs and UEs is not limited to the example shown in FIG. 1. In addition, a gNB may be called a different name if it has a function corresponding to a radio base station that transmits and receives radio signals to and from a UE.

The NG-RAN 20 actually contains multiple NG-RAN nodes, specifically, a gNB (or ng-eNB), and is connected to a core network (5GC, not shown) according to 5G. Note that the NG-RAN 20 and 5GC may simply be described as a network.

The gNB 100 is a radio base station in accordance with NR and performs radio communication in accordance with the UE 200 and NR. By controlling radio signals transmitted from multiple antenna elements, the gNB 100 and UE 200 are capable of supporting Massive MIMO, which generates a more directional beam BM, carrier aggregation (CA), which uses multiple component carriers (CCs) bundled together, and dual connectivity (DC), which simultaneously communicates between the UE and each of the multiple NG-RAN nodes.

In the radio communication system 10, DRX (Discontinuous Reception) may be applied to save power during standby of the UE 200. In the DRX, the UE 200 may stop monitoring the PDCCH (Physical Downlink Control Channel) for a certain period of time. Specifically, when waiting for an incoming call, the UE 200 attempts to receive a Paging message from the network once in a fixed period (DRX period). If the UE 200 receives a Paging message addressed to its own terminal at this time, it may release the waiting state and start communication with the network.

Paging may be interpreted as a procedure and signal to call the terminal (UE 200) in the waiting area when receiving a call. Also, when the UE 200 is waiting, it may be interpreted as the state of the UE 200 in the radio resource control layer (RRC) being RRC_IDLE. RRC_IDLE may be interpreted as the state in which the context of the UE 200 is maintained in the network but no data communication is performed.

DRX may include eDRX (Extended Discontinuous Reception). eDRX operating terminals may only attempt to receive Paging according to the DRX cycle within a periodic interval called PTW (Paging Time Window).

In addition, Wake-Up Signal may be applied to the radio communication system 10 to further reduce power in the RRC_IDLE state (mode) of the UE 200. As described above, the UE 200 periodically attempts to demodulate the PDCCH (which may be referred to as the downlink control channel) to acquire Paging information, but since the presence or absence of Paging information is not known until it is demodulated, it periodically attempts to demodulate the downlink control channel, causing power consumption of the UE 200 to increase.

The UE 200 can determine the presence or absence of Paging information by simple detection processing of the Wake-Up Signal, which can further reduce the power consumption. The Wake-Up Signal may be interpreted as wake-up indication specified in 3 GPP TS 38.212.

(2) Function Block Configuration of the Radio Communication System

Next, the functional block configuration of the radio communication system 10 is described. Specifically, the functional block configuration of the UE 200 is described.

Figure 2:
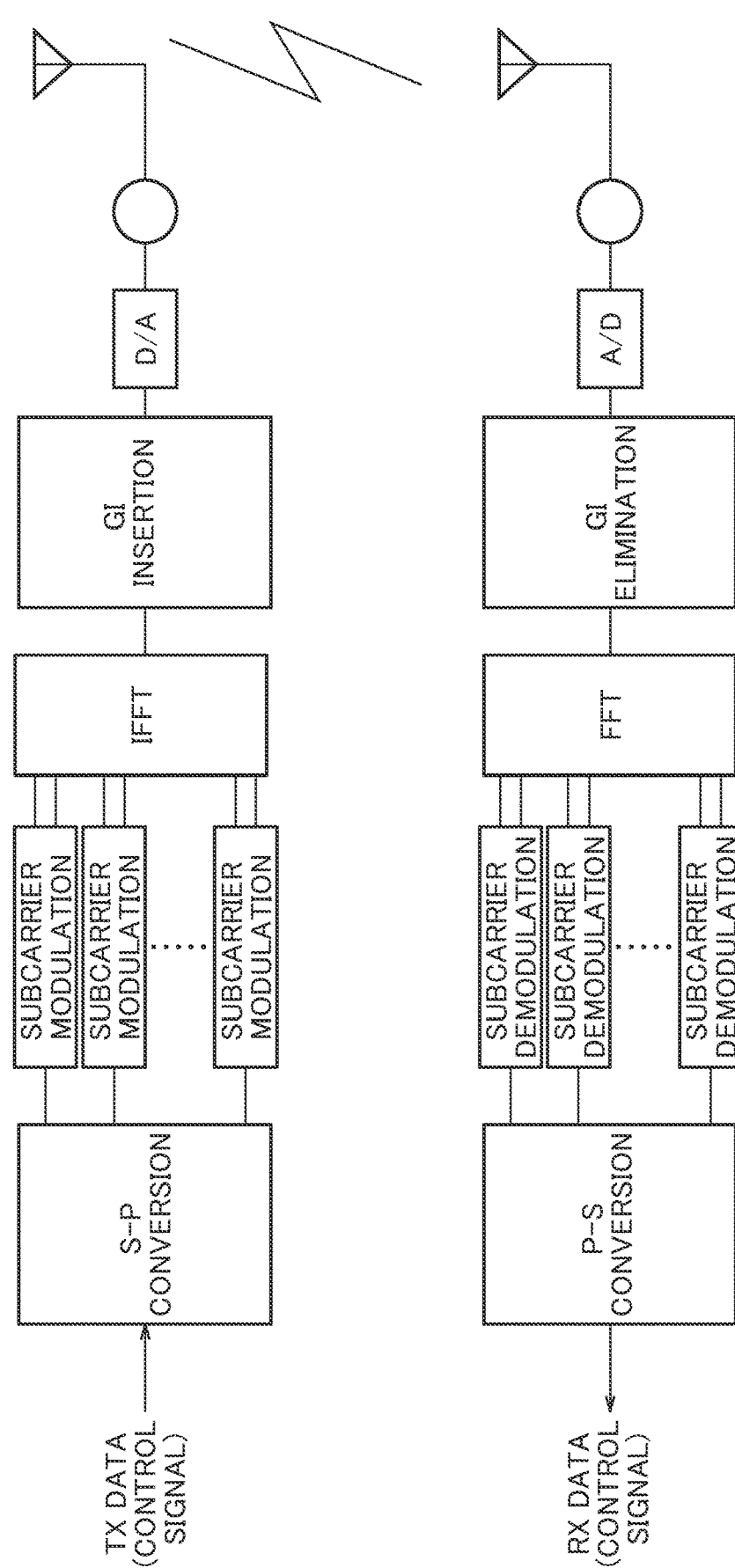
FIG. 2 is a functional block diagram of the UE 200.

FIG. 2 is a functional block diagram of the UE 200. As shown in FIG. 2, the UE 200 has a serial-parallel (S-P) conversion section, a subcarrier modulation section, an inverse Fourier transform (IFFT) section, a guard interval (GI) insertion section, and a D/A conversion section as functional blocks on the transmission side. Note that the gNB 100 may have a generally similar block configuration.

More specifically, the transmission data (and control signals may be included) are input to an S-P conversion section and subjected to serial-to-parallel conversion. The serial-to-parallel converted data series are subjected to pre-scribed modulation (such as orthogonal frequency division multiplexing (OFDM)) and IFFT. The GI is then inserted, converted from digital to analog signals and transmitted as a radio signal from the antenna.

The UE 200 is also equipped with an A/D conversion section, a guard interval elimination section, a Fourier transform (FFT) section, a subcarrier demodulation section and a parallel-serial (P-S) conversion section as functions on the receiving side.

Specifically, the signal received through the antenna is converted from analog to digital and GI removed. FFT and predetermined demodulation are then performed and output as received data (and control signals may be included).

(3) Receiver-Side Equipment Configuration of the UE 200

Figure 3A:
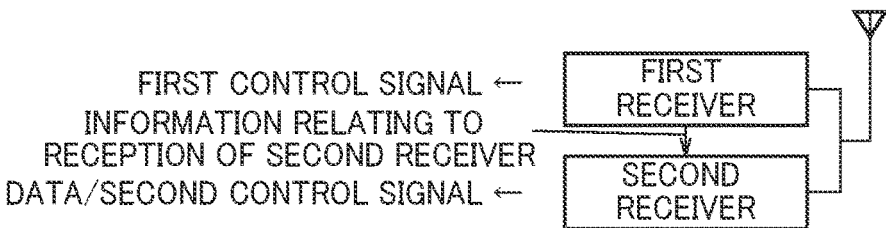
FIG. 3A is a diagram showing an example (part 1) of a receiver configuration of the UE 200.

In FIG. 2, the transmitter-side and receiver-side functional block configurations of the UE 200 are described, but the receiver-side equipment (hardware) configuration of the UE 200 may be configured as either of the following:

FIG. 3A shows an example of the receiver-side equipment configuration of the UE 200. As shown in FIG. 3A, the UE 200 may have two receivers, specifically, a first receiver and a second receiver. The first receiver and the second receiver may be separate and independent receivers as hardware. That is, each of the first receiver and the second receiver may be equipped with a receiver-side functional block shown in FIG. 2.

Although FIG. 3A shows a configuration in which the first and second receivers are connected to the same antenna, a separate antenna may be connected for each receiver.

In the case of the device configuration as shown in FIG. 3A, the first receiver may receive the first control signal and the second receiver may receive the second control signal or data. It is also desirable that the first receiver has a lower power consumption than the second receiver. In other words, it is desirable that the first receiver has a low power consumption dedicated to receiving the first control signal (which will be described in detail later). On the other hand, the second receiver may be an existing receiver capable of supporting OFDM or the like. That is, power consumption of the second receiver may be higher than power consumption of the first receiver.

In addition, the first receiver may operate only by the energy received from radio waves in the air without the need for a power supply (That is, the receive standby power may be zero), as in the case of a so-called "ore radio" for receiving the first control signal.

The first control signal is received by the first receiver but may be related to a second control signal or data received by the second receiver. Specifically, the first control signal may include at least either information, instructions or controls regarding the second control signal or data received by the second receiver.

The control signal may be interpreted as a signal sent from the network to the UE 200 to perform control of the UE 200 or as a signal sent from the UE 200 to the network to control the UE 200.

The data may be interpreted as information that has some meaning associated with the operation of the application or device that is transmitted and received by the application running on the UE 200 or the device connected to the UE 200. The data may be referred to as user data in order to distinguish it from control signals (data). In addition, control signals may be read as control channels and data as data channels.

In this way, the first receiver can receive a first control signal containing at least either information, instructions or controls regarding the second control signal or data received by the second receiver. Information, instructions or controls regarding the second control signal or data may be interpreted as follows:

(i) Whether or not the data/control signal received by the second receiver is received, and/or at least one of the periods during which the data/control signal is received by the second receiver ("/" is used to mean "and/or," hereinafter the same)

Thus, by the first control signal containing information indicating whether or not the second control signal or data is received, or the period during which the second control signal or data is received, unnecessary signal reception and demodulation (decoding) operations at the first receiver can be avoided, thus contributing to the low power consumption of the first receiver.

(ii) Information required for receiving the data/control signal received by the second receiver (For example, aggregation level of PDCCH (CORESET), downlink control information (DCI) format, subcarrier spacing (SCS), time/frequency resources, reception period (timing) of second receiver, etc.)

Thus, by the first control signal containing information required for receiving the data/control signal of the second receiver, the reception decoding operation attempted by the first receiver can be partially omitted, thus contributing to the low power consumption of the first receiver.

(iii) Part of the data/control signal received by the second receiver (For example, a portion of one DCI is received by the first receiver and the remainder of that DCI is received by the second receiver)

Thus, since the first receiver can reduce the number of bits received at the second receiver by receiving a portion of the data/control signal received by the second receiver, the signal can be transmitted with less energy, and a lower power consumption can be expected at the receiver. It should be noted that the information about the second control signal or data received by the second receiver may include information such as the DCI in which a portion is received by the first receiver and the remainder is received by the second receiver.

The first receiver may continuously receive the first control signal and the second receiver may intermittently receive the second control signal. Continuous reception means receiving the signal continuously over a predetermined period of time (For example, a slot or subframe), and intermittent reception may mean receiving the signal discontinuously during the predetermined period, that is, there is a period of time during which no signal is received at the predetermined institution. Alternatively, the first control signal may be a signal longer in continuous time than the second control signal in comparison with the second control signal. Or, the first control signal and the second control signal may be discontinuous signals and the first control signal may be a signal transmitted with a shorter period than the second control signal in comparison with the second control signal.

Also, the frequency band to which the first control signal is allocated may be narrower than the frequency band to which the second control signal or data is allocated. That is, the frequency resources (May be read as number of subcarriers, resource block (RB), bandwidth part (BWP), component carrier (CC), etc.) used for transmitting the first control signal may be less than the frequency resources used for transmitting the second control signal.

The first receiver may be used for a supplemental downlink (SDL) that supplements the downlink (DL) received by the second receiver. That is, the first receiver may be used for an SDL reception and the second receiver may be used for a normal DL reception.

The first and second control signals may also be used for paging in the idle mode (Specifically, RRC_IDLE) of the UE 200. In this case, information, instruction or control regarding the second control signal or data received by the second receiver may be read as information, instruction or control regarding monitoring and paging reception for paging.

Figure 3B:
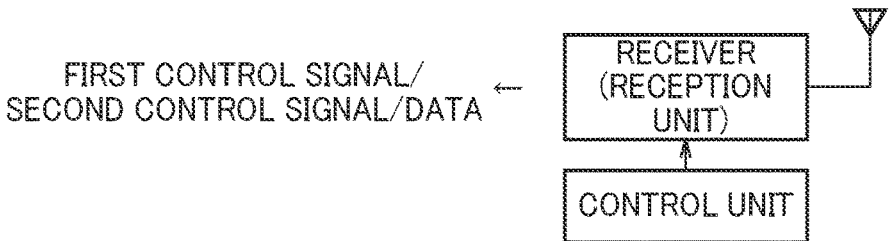
FIG. 3B is a diagram showing an example (part 2) of a receiver configuration of the UE 200.

FIG. 3B shows an example of a receiver configuration (part 2) of the UE 200. As shown in FIG. 3B, the UE 200 may have a single receiver. That is, the UE 200 may not have multiple (2) receivers, but only one receiver, as shown in FIG. 3A. A single receiver (reception unit) may have the receiver-side functional block shown in FIG. 2.

In the case of the device configuration shown in FIG. 3B, the receiver (reception unit) may receive a first control signal, a second control signal and data. It may also be equipped with an control unit that controls the reception of the first control signal, the second control signal and data.

The control unit can control the reception of the second control signal or data based on the first control signal containing at least either information, instructions or controls regarding the second control signal or data. Here, the first control signal and the second control signal may differ in at least either frequency resources or time resources to be used.

That is, the first and second control signals are received by a single receiver, but the first and second control signals may be received at different time/frequency resources. Compared with the configuration shown in FIG. 3A, such a configuration is less effective in reducing the receiving power consumption, but since multiple receivers are not required and a single receiver can be used, the affinity with the existing 3GPP specifications is high (the existing UE configuration can be used), and the influence on such specifications can be reduced.

In addition, the frequency band to which the first control signal is allocated may be narrower than the frequency band to which the second control signal or data is allocated. That is, as described above, the frequency resources (May be read as number of subcarriers, resource block (RB), bandwidth part (BWP), component carrier (CC), etc.) used for transmitting the first control signal may be less than the frequency resources used for transmitting the second control signal.

In addition, the size of inverse Fast Fourier Transform (FFT) applied to the first control signal (number of FFT points) may be smaller than the FFT size applied to the second control signal.

In addition, the subcarrier spacing (SCS) applied to the first control signal may be different from the subcarrier spacing applied to the second control signal. Specifically, the SCS applied to the first control signal may be smaller or larger than the SCS applied to the second control signal.

Similarly, the carrier frequency applied to the first control signal (which may be read as the subcarrier frequency) may be different from the carrier frequency applied to the second control signal. Specifically, the carrier frequency applied to the first control signal may be lower or higher than the carrier frequency applied to the second control signal.

This relationship among FFT size, SCS and carrier frequency may be applied not only to the receiver-side device configuration shown in FIG. 3B but also to the receiver-side device configuration shown in FIG. 3A, that is, the first receiver and the second receiver.

In addition, the first receiver may have the following characteristics (absolute characteristics) in relation to the second receiver.

Receivers that do not have an FFT on the receiving side or that do not perform parallel-serial conversion on the receiving side Receivers that do not consume power when detecting received signals Receivers that do not perform demodulation using a reference signal for demodulation (DMRS)

Alternatively, the first receiver may have the following characteristics (relative characteristics) in comparison with the second receiver.

Receiver with small receiver FFT size (number of FFT points)

Receiver with small receiver bandwidth

Receiver with small (or large) SCS

Receiver with small (or large) carrier frequency

Receiver with power consumption smaller than second receiver at the time of receiving signal detection Receiver with narrow band (low sampling rate) (receiving method with lower power consumption compared to receiver with wide band (high sampling rate))

Receiver with smaller (or larger) index of receiver (time/frequency resource) received at different time/frequency resources than second receiver Note that in the present embodiment, the first receiver may be read as the first control signal, the first received signal, the first control channel, and the first channel, and the second receiver may be read as the second control signal, the second received signal, the second control channel, and the second channel.

(4) Transmitter Equipment Configuration of gNB 100

Figure 3C:
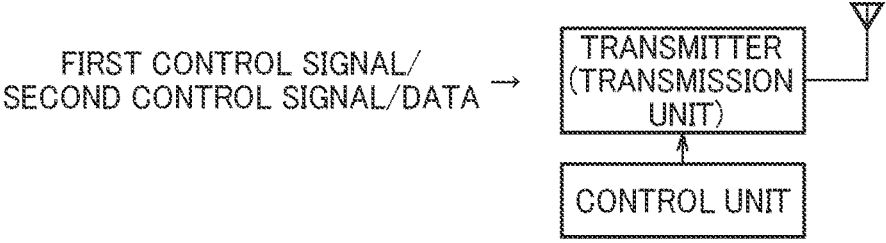
FIG. 3C is a diagram showing the device configuration of the transmission side of the gNB 100.

FIG. 3C shows the transmitter equipment configuration of gNB 100. As shown in FIG. 3C, gNB 100 may include a transmission unit and a control unit.

The transmission unit may transmit a first control signal to the first receiver of UE 200 and a second control signal or data to the second receiver of UE 200.

The control unit may cause the transmission unit to transmit said first control signal containing at least either information, instructions or controls regarding the second control signal or data received by the second receiver.

In addition, as described above, the first control signal and the second control signal transmitted by the gNB 100 may differ in at least either frequency resources or time resources to be used.

(5) Operation of the Radio Communication System

Next, operation of the radio communication system 10 is described. Specifically, the operation related to the reception of control signals and data by the UE 200 is described. More specifically, the operation examples 1 to 5 related to the reception of control signals and data by the UE 200 are described.

(5.1) Operation Example 1

Figure 4:
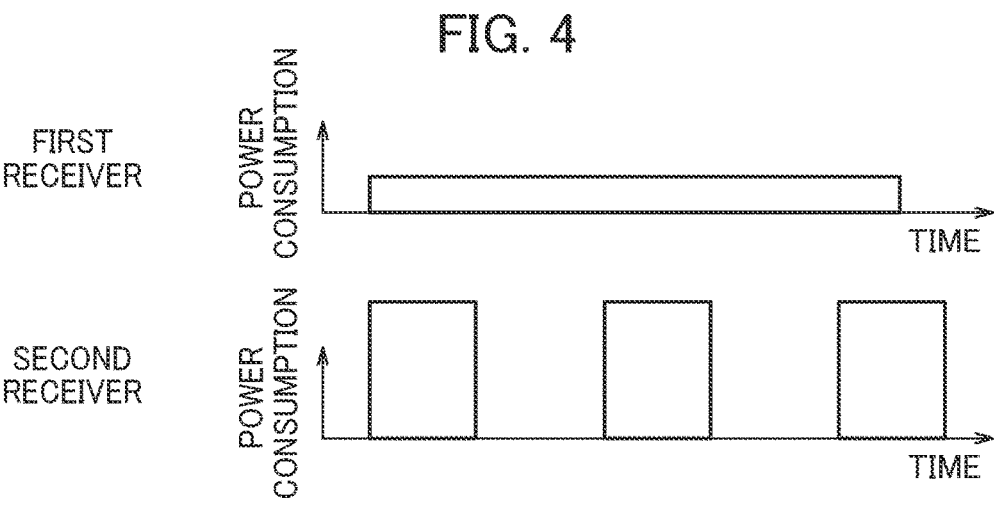
FIG. 4 is a diagram showing an example (part 1) of power consumption and the reception period of the first and second receivers in operation example 1.

FIG. 4 shows an example (part 1) of power consumption and reception period of the first and second receivers in Operation Example 1. As shown in FIG. 4, the first receiver may continuously receive signals and the second receiver may intermittently receive signals.

That is, the first receiver may continuously receive the first control signal and the second receiver may intermittently receive the second control signal.

For example, the second receiver may receive PDCCH only for the duration of DRX on Duration, receive and measure PDSCH (Physical Downlink Shared Channel)/ Channel State Information-Reference Signal (CSI-RS) only on resources scheduled by PDCCH or set by the upper layer, and receive and measure SSB (SS/PBCH Block) consisting of Synchronization Signal (SS) and Physical Broadcast CHannel (PBCH) only for a predetermined period (normal operation in NR).

CSI-RS is a reference signal transmitted to measure the state of the radio channel, and the DMRS described above is a known reference signal (pilot signal) between individual base stations and terminals for estimating the fading channel used for data demodulation.

The channel includes a control channel and a data channel. The control channel may include a PDCCH (Physical Downlink Control Channel), a PUCCH (Physical Uplink Control Channel), a RACH (Downlink Control Information (DCI) including Random Access Channel, Random Access Radio Network Temporary Identifier (RA-RNTI)), and a Physical Broadcast Channel (PBCH).

The data channel may also include a PDSCH (Physical Downlink Shared Channel), and a PUSCH (Physical Uplink Shared Channel). Data may mean data transmitted over a data channel.

Also, as shown in FIG. 4, the receiving power consumption power consumption of the first receiver is lower than that of the second receiver. Although the receiving power consumption can be set to zero in the case of the configuration of an ore radio as described above, it is shown in the figure for convenience that a constant power consumption is generated (hereinafter the same).

Figure 5:
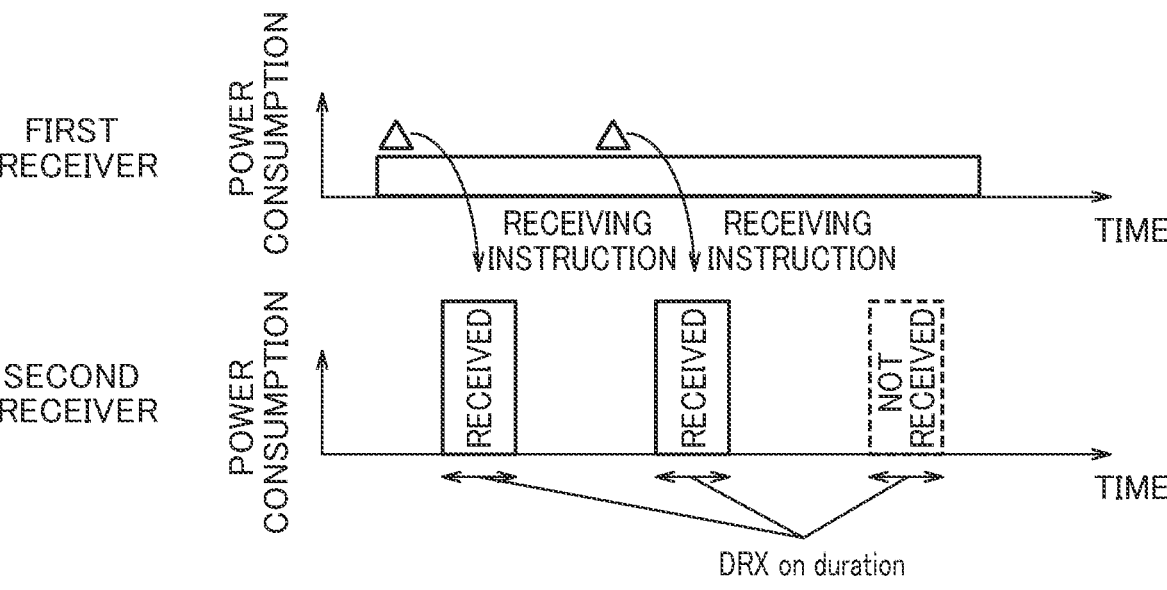
FIG. 5 is a diagram showing an example (part 2) of power consumption and the reception period of the first receiver and the second receiver in operation example 1.

FIG. 5 shows an example (part 2) of power consumption and the receiving period of the first and second receivers in operation example 1. As shown in FIG. 5, when reception instructions are notified by the first receiver, the second receiver may receive control signals (second control signals)/data according to the instructions.

The first receiver may receive control signals (first control signals) and notify receiving instructions to the second receiver based on the contents of the control signals.

The second receiver may perform receiving operations during the period of DRX on Duration based on the receiving instructions. On the other hand, the second receiver need not perform the receiving operation during the period when the receiving instruction is not notified.

Figure 6:
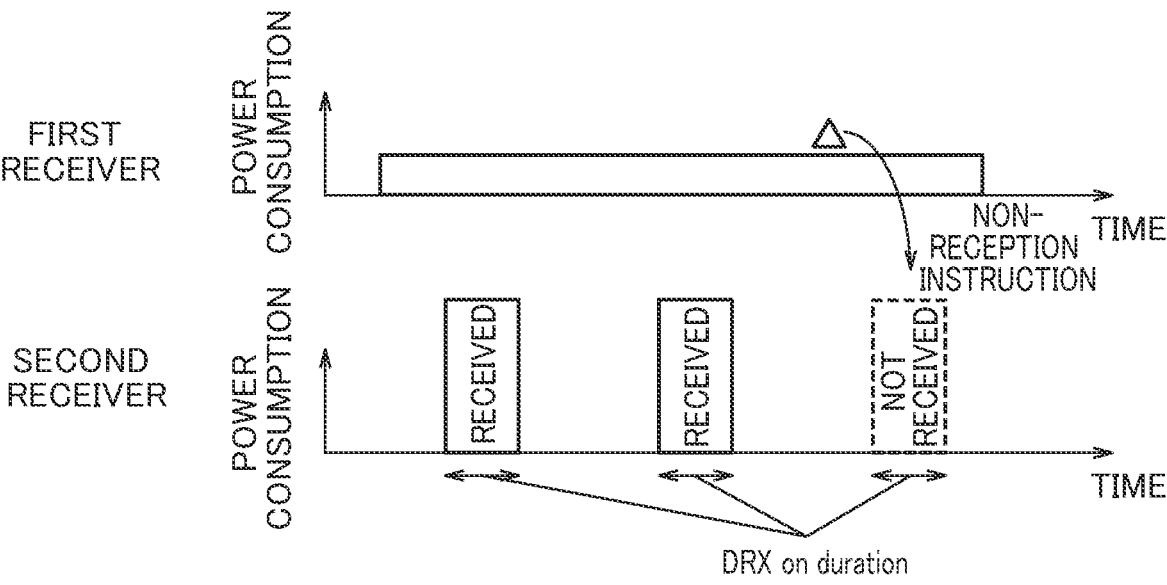
FIG. 6 is a diagram showing an example (part 3) of power consumption and the reception period of the first and second receivers in operation example 1.

FIG. 6 shows an example (part 3) of power consumption and the receiving period of the first and second receivers in operation example 1. FIG. 6 shows that, contrary to FIG. 5, the second receiver may receive the control signal (second control signal)/data unless a non-reception instruction is notified by the first receiver. When the non-reception instruction is notified, the second receiver may not perform the receiving operation during the period corresponding to the notification (DRX on Duration). Compared with the example in FIG. 5, the example in FIG. 6 is expected to be more tolerant of errors (errors) at the time of reception or notification, since the number of non-reception instructions to be notified is assumed to be lower than the number of reception instructions to be notified.

Figure 7:
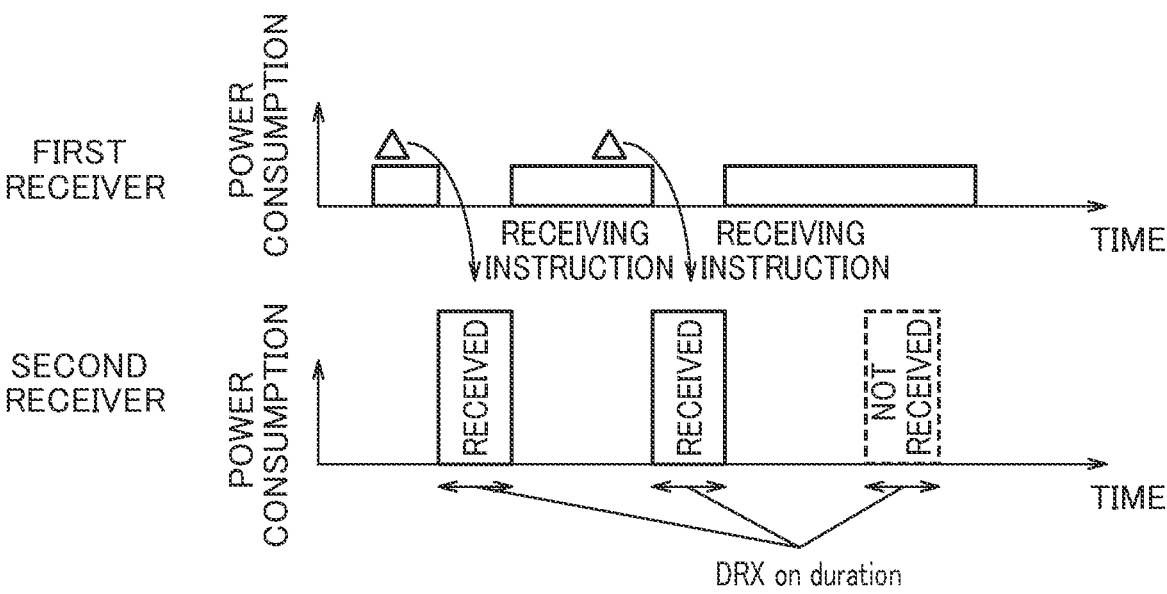
FIG. 7 is a diagram showing an example (part 4) of power consumption and the reception period of the first and second receivers in operation example 1.

FIG. 7 shows examples (part 4) of power consumption and the reception period of the first and second receivers in Operation Example 1. As shown in FIG. 7, the first and second receivers may not receive at the same time.

Specifically, during the second receiver's receiving period (DRX on duration), the first receiver stops (or may stop) the receiving operation. This can further reduce power consumption of the first receiver. In addition, this simplifies the configuration of the UE 200 because the first and second receivers can be shared (a single receiver can be used).

Figure 8:
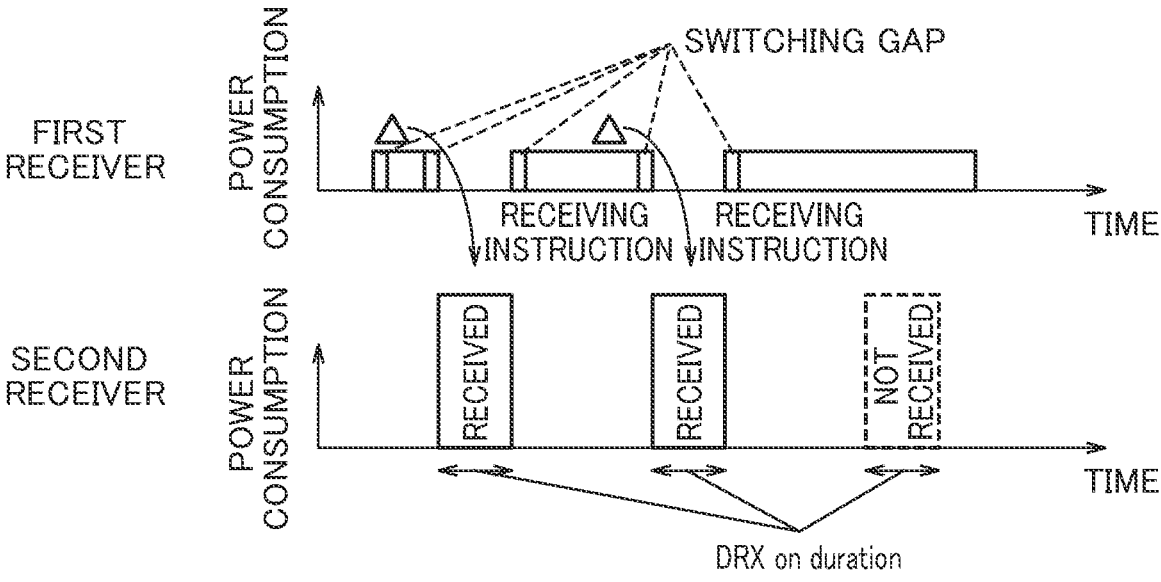
FIG. 8 is a diagram showing an example (Part 5) of power consumption and the reception period of the first receiver and the second receiver in Operation Example 1.

FIG. 8 shows an example (part 5) of power consumption and reception period of the first and second receivers in Operation Example 1. As shown in FIG. 8, a switching gap of the receiver may be provided between the reception period of the first receiver and that of the second receiver.

In this case, since it depends on the configuration of the UE 200 (depending on whether a common receiver is used by the first receiver and the second receiver), the UE 200 may report the necessity of the switching gap/the value (time) of the switching gap to the network as UE Capability Information.

The network (gNB 100) may also set the switching gap by the control signal (signaling) of the upper layer. Alternatively, the value of the switching gap, etc., may be predetermined by 3GPP specifications. The UE 200 may not receive (or assume to receive) any signal at either the first or second receiver in the switching gap.

The switching gap may be a value indicating that the first receiver does not receive part (the beginning or the end) of its receiving period. Similarly, it may be a value indicating that the second receiver does not receive part (the beginning or the end) of its receiving period.

Note that in a UE 200 (that is, a UE that can receive simultaneously at the first receiver and the second receiver) composed of different devices (hardware) in which the first and second receivers are separate, the switching gap may not be necessary.

In the example shown in FIG. 8, a switching gap is provided on the side of the signal received by the first receiver (first control signal), but a switching gap may be provided on the side of the signal received by the second receiver (second control signal).

(5.2) Operation Example 2

With respect to the received signal sequence of the first receiver, the UE 200 may operate as follows:
(i) On/Off Keying
The UE 200 may determine the presence or absence of a received signal based on the presence or absence of the received signal sequence, that is, whether or not it can be received (Whether the received power is above the specified value or whether the correlation value between the received signal and the specified signal (the signal to be transmitted) is above the specified value).
(ii) Non-Coherent Detection
This is a signal transmission method that does not require (or use) DMRS. For example, it may be a sequence-based transmission such as NR PUCCH format 0.

Sequence-based transmission may be interpreted as follows: Multiple candidate sequences are notified/set in advance between the transmitter and receiver, each transmission signal sequence corresponding to an information bit has a common understanding, and the transmitter selects and transmits the transmission signal sequence according to the information bit. The receiver identifies the transmission signal sequence by detecting a correlation between the received signal and each transmission signal sequence, and obtains the transmission information bits.

Alternatively, differential modulation may be used. For example, the respective signals of signal points A and B may be modulated (Binary Phase Shift Keying (BPSK), Quadrature Phase Shift Keying (QPSK), Quadrature Amplitude Modulation (16 QAM), etc.), and the difference of the modulation between signal points A and B (how many times the phase has changed) may be used to inform information. Signal points A and B may each be transmitted by different resources in time/frequency/space/Multiple-Input Multiple-Output (MIMO) layers.

(iii) Coherent Detection

A signal transmission method that requires (or uses) DMRS. Specifically, DMRS and modulated signals (information bits) are multiplexed and transmitted by resources with different time/frequency resources.

In this case, they may be received by a predetermined modulation method (For example, always QPSK, etc.). The modulation method may also be notified or set by a control signal in the upper layer. As described above, such received signal sequences may be transmitted and received over a narrow band (low sampling rate) compared to the second receiver, and may be even lower received power consumption.

In a method other than (i), multiple information bits can be received by the first receiver. Exploitation when multiple bits can be received includes the aforementioned information about the second control signal or data, "information necessary for receiving data/control signals received by the second receiver" in instructions or controls, and "part of data/control signals received by the second receiver." Furthermore, an example of FIG. 9, which will be described later, is also given.

In addition, when DMRS is not required (not used) as in (i) and (ii), channel estimation is also not required, so further reduction of received power consumption can be expected.

Figure 9:
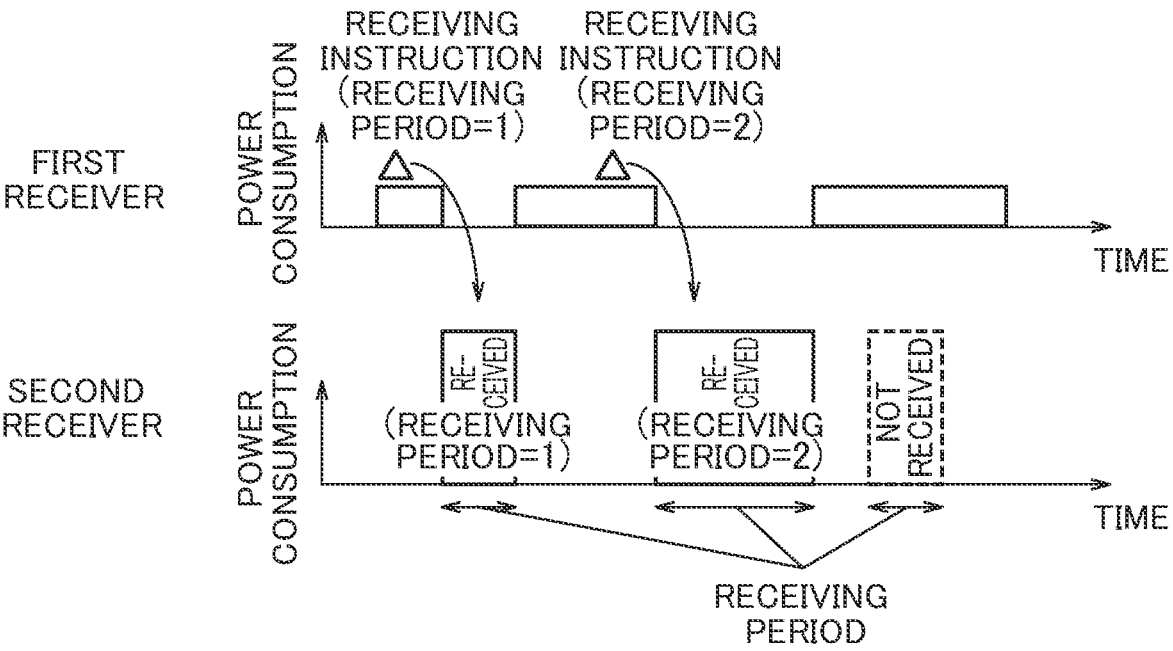
FIG. 9 is a diagram showing an example of power consumption and the reception period of the first receiver and the second receiver in Operation Example 2.

FIG. 9 shows an example of power consumption and receiving period of the first receiver and the second receiver in operation example 2. When the first receiver can receive multiple information bits, the first receiver may receive the receiving period (For example, the length of the PDCCH measurement/detection period) of the second receiver as shown in FIG. 9. The second receiver performs the receiving operation based on the length of the receiving period (receiving period=1 or 2).

This makes it possible to give measurement instructions to the flexible second receiver so that the receiving operation of the second receiver can be performed in the minimum required period, and further reduction of the receiving power consumption can be expected.

(5.3) Operation Example 3

With respect to the resource/signal sequence monitored by the first receiver, the UE 200 may operate as follows:

Specifically, the UE 200 reports to the network the resource/signal sequence monitored by the first receiver (The initial value that determines the transmission signal sequence (c_init of PN sequence, initial index of series/cyclic shift), etc.) and the capability information such as the detection method (UE Capability Information). The UE 200 may assume that the operation according to the present embodiment is set from the network (gNB 100) only when the capability information is reported.

Alternatively, the network (gNB 100) may instruct/set the UE 200 about the resource/signal sequence (The initial value that determines the transmission signal sequence (c_init of PN sequence, initial index of series/cyclic shift), etc.) monitored by the first receiver, the detection method, etc., using the control signals of the upper layer (For example, RRC). When the instruction/setting is made, the UE 200 may assume the operation according to the present embodiment.

In addition, the resource/signal sequence (The initial value that determines the transmission signal sequence (c_init of PN sequence, initial index of series/cyclic shift), etc.) monitored by the first receiver and the detection method, etc. may be specified in advance as the specifications of 3 GPP. The UE 200 may assume the operation according to this embodiment even when the instruction/setting is not made, but in this case, the resource/signal sequence (The initial value that determines the transmission signal sequence (c_init of PN sequence, initial index of series/cyclic shift), etc.) monitored by the first receiver and the detection method, etc. may be determined using a prescribed method.

Figure 10:
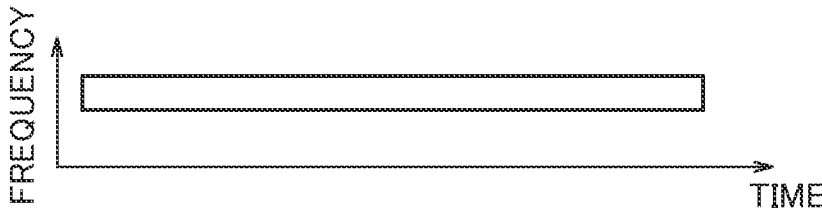
FIG. 10 is a diagram showing the setting in the upper layer and an example (part 1) of the frequency/time relationship in operation example 3.
Figure 11:
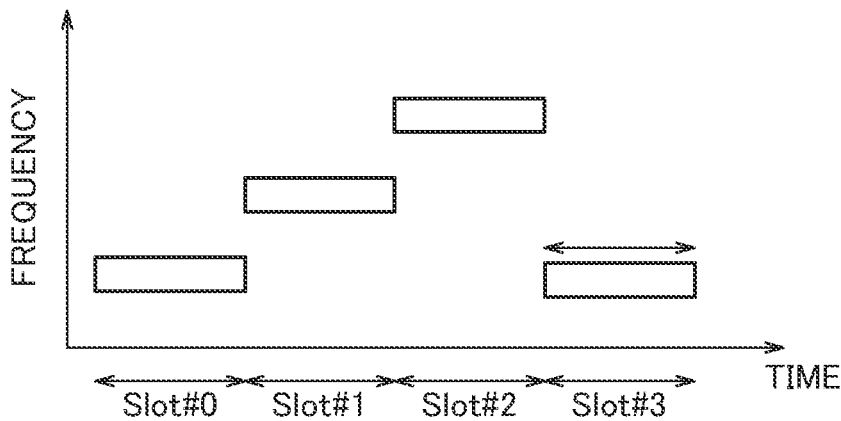
FIG. 11 is a diagram showing an example (part 2) of the frequency/time relationship in operation example 3.

FIGS. 10 and 11 show examples of how to set resources monitored by the first receiver. Specifically, FIG. 10 shows an example (part 1) of the configuration in the upper layer and the frequency/time relationship in operation example 3. FIG. 11 shows an example (part 2) of the frequency/time relationship in operation example 3.

As shown in FIG. 10, the upper layer indicates the index of the start and end frequencies of the monitor by the first receiver. The UE 200 executes the monitor by the first receiver based on the notification in the upper layer. The frequency bandwidth to be monitored by the first receiver may be indicated instead of the index of the ending frequency.

FIG. 10 shows an example of a basic pattern in which the starting and ending frequencies (frequency bandwidth) are constant. On the other hand, as shown in FIG. 11, the frequency resource may be hopped according to a predetermined rule at every predetermined time unit (For example, slot). This can improve the reliability of reception.

Figure 12:
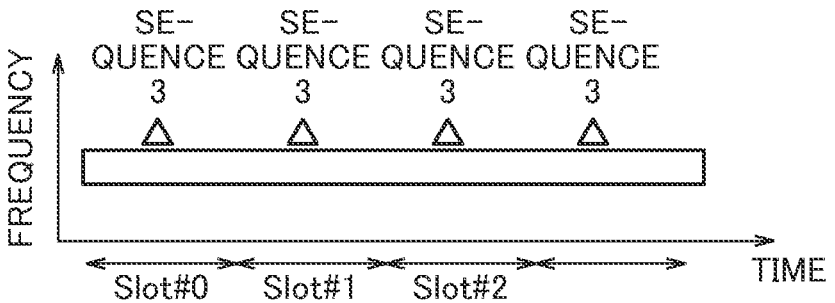
FIG. 12 is a diagram showing the setting in the upper layer and an example (part 3) of the frequency/time relationship in operation example 3.
Figure 13:
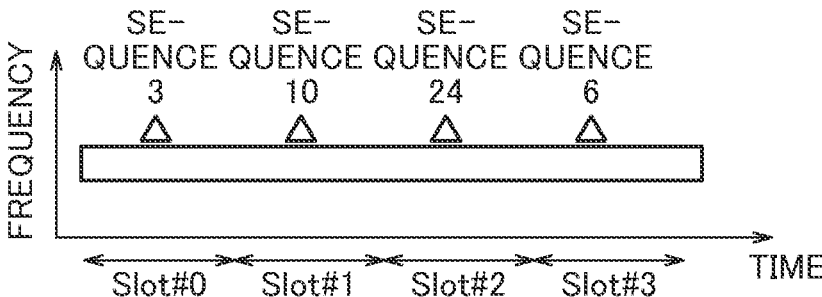
FIG. 13 is a diagram showing an example (part 4) of the frequency/time relationship relating to operation example 3.

FIGS. 12 and 13 show examples of resource/signal sequences (The initial value that determines the transmission signal sequence (c_init of PN sequence, initial index of series/cyclic shift), etc.) monitored by the first receiver.

Specifically, FIG. 12 shows an example (part 3) of the setting in the upper layer and the frequency/time relationship in operation example 3. FIG. 13 shows an example (part 4) of the frequency/time relationship in operation example 3.

As shown in FIG. 12, the upper layer shows the sequence initial index of the monitor by the first receiver. The UE 200 executes the monitor by the first receiver based on the notification in the upper layer.

FIG. 12 shows an example of a pattern in which no sequence is hopped per time unit. On the other hand, the sequence may be hopped per time unit as shown in FIG. 13. Thus, inter-cell interference can be reduced. In the same way as the existing uplink (UL) or downlink (DL) sequence hopping, if the initial index and cell ID are given, the sequence may be hopped in time. If the initial index is not given, the sequence may be hopped in time based on the cell ID.

A radio base station is deployed so that an orthogonal sequence is basically assigned to each cell, but it is assumed that the same sequence is accidentally used in the neighborhood due to the location and other conditions. Considering such a case, it can be assumed that the sequence is hopped in time as shown in FIG. 13.

Also, the resources monitored by the first receiver may vary from cell to cell. Different resources can be set for each cell if the higher layer notifies resources on a UE or cell by cell basis. In addition, resources may be hopped (additional cell-specific offsets) according to the cell ID. Hopping of resources according to the cell ID may be enabled or disabled by a higher layer.

Figure 14:
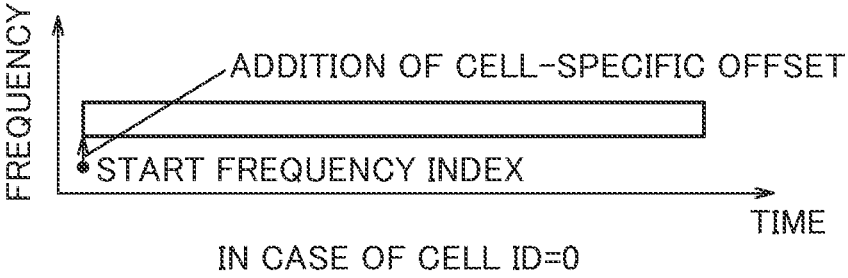
FIG. 14 is a diagram showing the setting in the upper layer and an example (part 5) of the frequency/time relationship in operation example 3.
Figure 15:
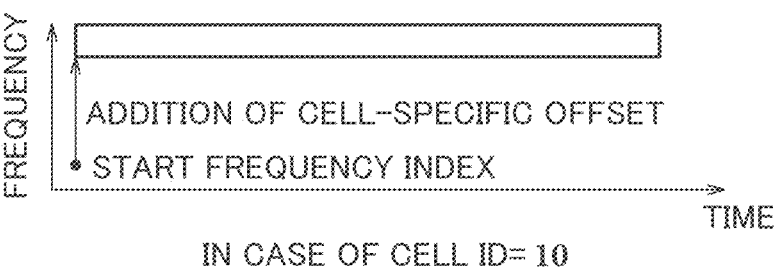
FIG. 15 is a diagram showing an example (part 6) of the frequency/time relationship in operation example 3.

FIGS. 14 and 15 show examples of how to set resources monitored by the first receiver. Specifically, FIG. 14 shows an example (part 5) of setting in the upper layer and frequency/time relationship in Operation Example 3. FIG. 15 shows an example (part 6) of frequency/time relationship in Operation Example 3.

The cell-specific offset shown in FIGS. 14 and 15 may be a value determined by the cell ID or a value determined by the cell ID and the slot index (in which case it may also be hopped in time). FIG. 14 shows an example of cell ID=0 and FIG. 15 shows an example of cell ID=10, where the amount of offset in the frequency direction varies according to the cell ID.

Alternatively, the cell-specific offset may be determined by the UE-individual ID or by an ID that is set common to the group. This allows the UEs to measure different resources. Although FIGS. 14 and 15 show examples of frequency resources, the target resources may be other orthogonal resources such as time/code/MIMO layer/sequence/cyclic shift.

Also, in the examples shown in FIGS. 14 and 15, the resources monitored by the first receiver can be prevented from being used by other cells, thereby reducing interference between cells.

(5.4) Operation Example 4

The above operation example may have the following variations. For example, the first and second receivers may not be separate receivers (hardware) but the same receiver (see FIG. 3B), and the first control signal (channel) and the second control signal/data (channel) may be received using different time/frequency resources.

In this case, as described above, the reduction effect of the receiving power consumption becomes low, but since multiple receivers are not required and a single receiver can be used, the affinity with the existing 3GPP specifications is high (the existing UE configuration can be used), and the influence on the specifications can be suppressed.

Figure 16:
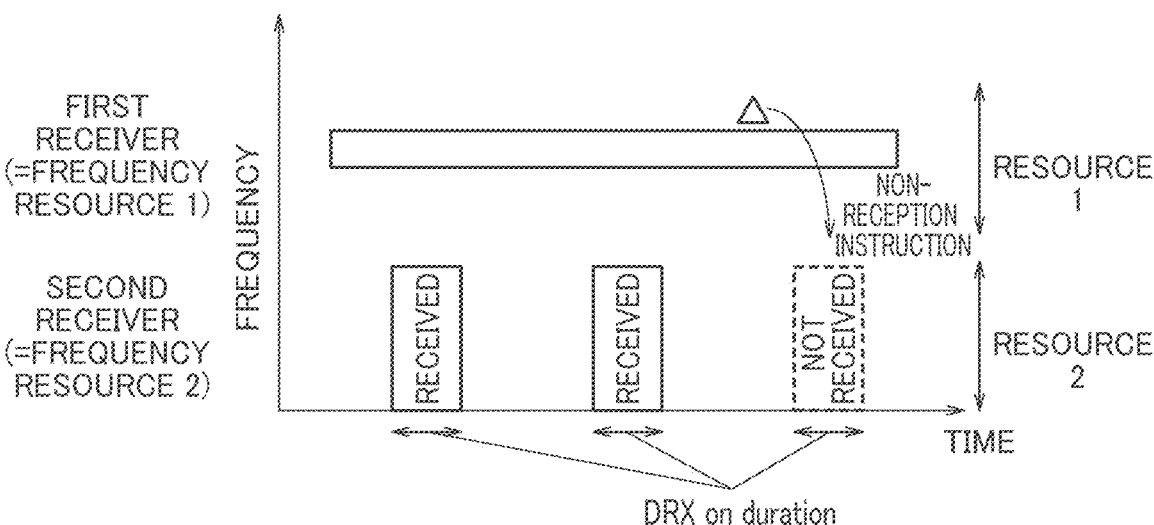
FIG. 16 is a diagram showing an example (part 1) of power consumption and the reception period of the first and second receivers in operation example 4.

FIG. 16 shows an example (part 1) of power consumption and reception period of the first and second receivers in Operation Example 4. As shown in FIG. 16, frequency resource 1 detects (Demodulation, Decoding) signals with fewer received signal sequences because the frequency bandwidth is narrow compared with frequency resource 2. Thus, power consumption associated with receiving a signal sequence using frequency resource 1 can be lower than power consumption associated with receiving a signal sequence using frequency resource 2.

Although the first receiver and the second receiver are shown in FIG. 16, as described above, the same receiver may be used to receive a signal sequence using frequency resource 1 and frequency resource 2.

Figure 17:
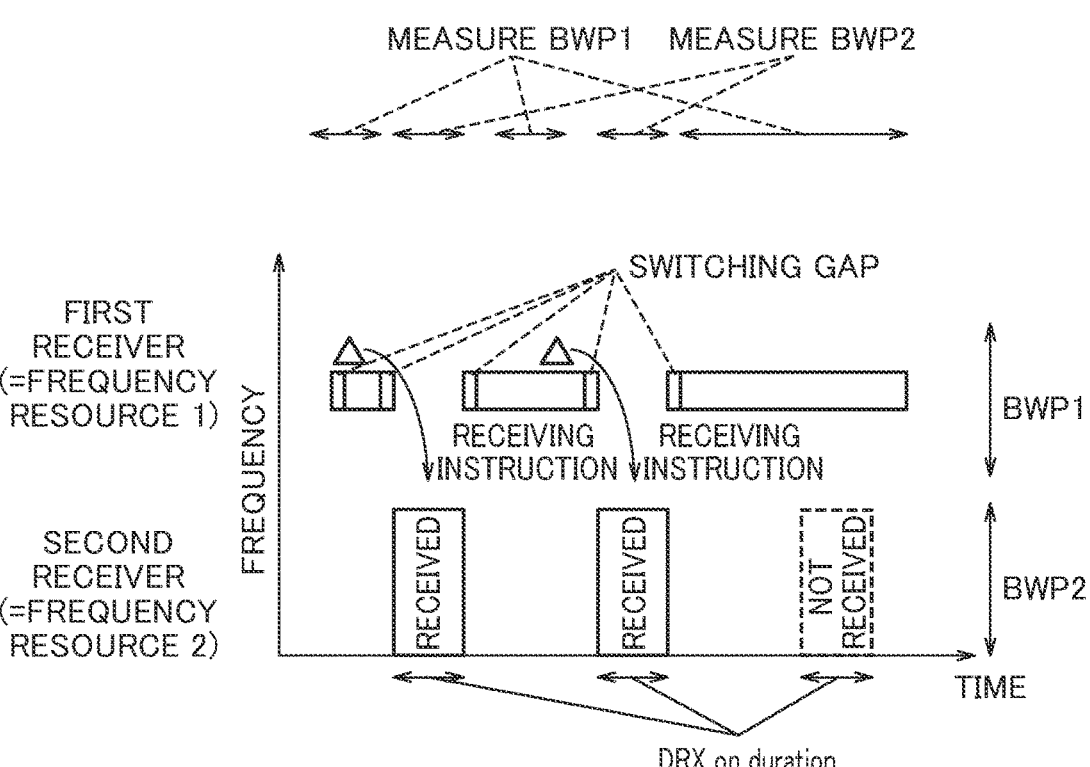
FIG. 17 is a diagram showing power consumption of the first receiver and the second receiver and an example (part 2) of the reception period in Operation Example 4.

FIG. 17 shows an example (part 2) of power consumption and the reception period of the first receiver and the second receiver in Operation Example 4. As shown in FIG. 17, the UE 200 may perform an operation similar to the example shown in FIG. 16 by taking advantage of BWP switching of NR, allocating BWP to each frequency resource, and performing BWP switching. Moreover, as shown in FIG. 17, the switching gap of the receiver may also be set in this operation example.

In this case, the UE 200 may measure the received signal in a predetermined BWP (monitor the PDCCH) in a predetermined period (DRX, for example) and measure the received signal in another BWP (For example, BWP2) different from the predetermined BWP (For example, BWP1) based on the measurement result of the received signal in the predetermined BWP.

Figure 18:
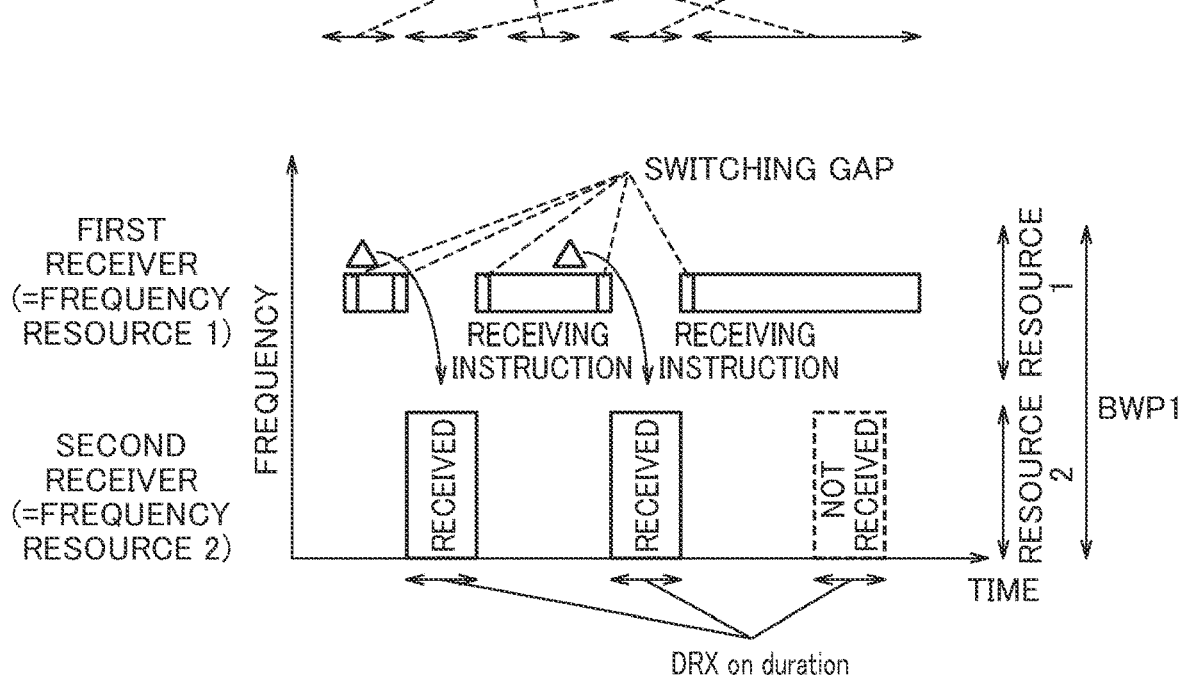
FIG. 18 is a diagram showing power consumption of the first receiver and the second receiver according to operation example 4 and an example (part 3) of the reception period.

FIG. 18 shows power consumption of the first receiver and the second receiver according to operation example 4 and an example (part 3) of the reception period. In the example shown in FIG. 18, the BWP switching mechanism is not used, and the UE 200 may measure the received signal at a predetermined frequency resource (monitor PDCCH) in a predetermined period (DRX, for example) and measure the received signal at another frequency resource (For example, frequency resource 2) different from the predetermined frequency resource (For example, frequency resource 1) based on the measurement result of the received signal at the predetermined frequency resource.

Figure 19:
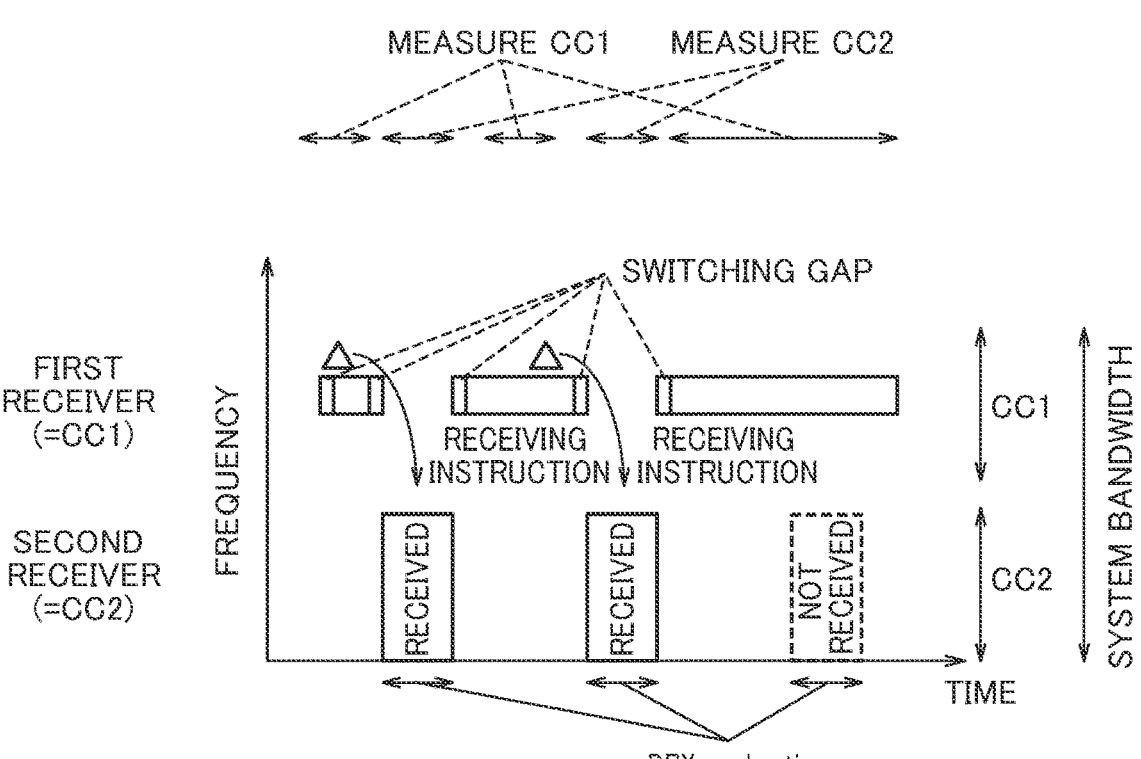
FIG. 19 is a diagram showing power consumption of the first receiver and the second receiver and an example (part 4) of the reception period.

FIG. 19 shows power consumption of the first receiver and the second receiver and an example (part 4) of the reception period. As shown in FIG. 19, the UE 200 may use a carrier aggregation (CA) mechanism to measure the received signal at a given CC in a given period (DRX, for example) (monitor the PDCCH) and measure the received signal at another CC (For example, CC2) different from the given CC (For example, CC1) based on the measurement result of the received signal at the given CC.

Figure 20:
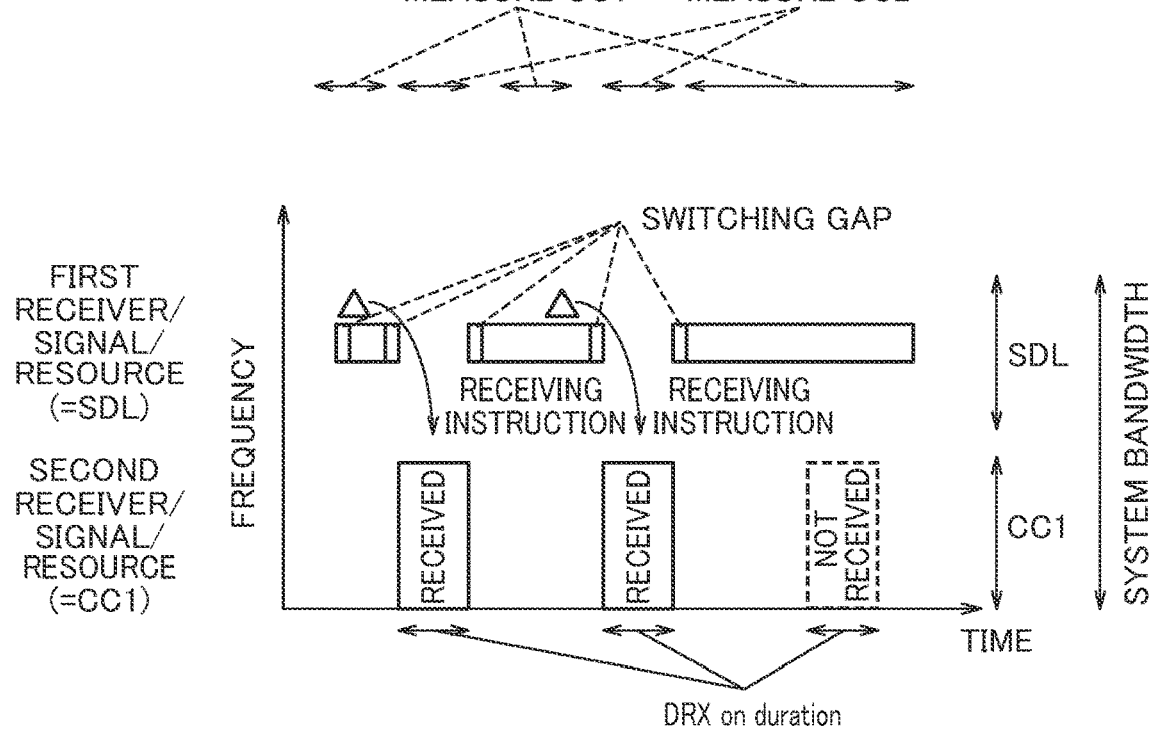
FIG. 20 is a diagram showing power consumption of the first receiver and the second receiver and an example (part 5) of the reception period.

FIG. 20 shows power consumption of the first receiver and the second receiver and an example (part 5) of the reception period. As shown in FIG. 20, the first receiver (Or it can be either received signal/resource/CC/BWP) may be used (set) as the SDL (Supplemental Downlink) of the second receiver (Or it can be either received signal/resource/CC/BWP).

It may differ from the CA shown in FIG. 19 in the following ways:
 An SDL by a first receiver (Or it can be either received signal/resource/CC/BWP) may not be treated as a single CC (not even counted).
 Only certain CCs (For example, Primary Cell (PCell)/Primary Secondary Cell (PSCell)) may be associated (or present) with an SDL.

That is, such behavior applies only to PCell/PSCell and may apply only when the SDL is set for PCell/PSCell. In this case, as shown in FIG. 20, the second receiver (Or it can be either received signal/resource/CC/BWP) may be read as a specific CC (For example, PCell/PSCell) and the first receiver (Or it can be either received signal/resource/CC/BWP) may be a (set) SDL associated with the specific CC.

In this operation example, the operation of the UE 200 at the first frequency (May be read as frequency resource/BWP/CC) and the second frequency (May be read as frequency resource/BWP/CC) may be different. For example, one common receiver may receive the first and second frequencies, but the measurement and detection operation of the received signal at each frequency resource may be different.

Also, as described above, the first receiver may receive the first control signal containing at least either information, instructions or controls on the second control signal or data received by the second receiver, but the first receiver and second receiver may be read as the received signal at the first frequency and the received signal at the second frequency.

Specifically, it may be expressed as follows: The UE 200 (receiver) receives control signals using the first frequency signal and also receives data/control signals using the second frequency signal.

More specifically, the UE 200 receives information, instructions or control content about a data/control signal by a signal at a second frequency using a signal at the first frequency. Information, instructions or control about a data/control signal by a signal at the second frequency may be interpreted as follows:

(i) the presence or absence of the reception of a data/control signal received by a signal at the first frequency and/or at least one of the reception periods of the data/control signal at the signal at the second frequency.

Thus, by including information indicating the presence or absence of the reception of the signal or data at the second frequency or the reception period of the signal or data at the first frequency, unnecessary signal reception and demodulation (decoding) operations at the signal at the first frequency can be avoided, thus contributing to a low power consumption for the reception of the signal at the first frequency.

(ii) Information required for the reception of the data/control signal received by the signal at the second frequency (For example, aggregation level of PDCCH (CORESET), downlink control information (DCI) format, subcarrier spacing (SCS), time/frequency resources, duration (timing) of second frequency signal reception, etc.)

Thus, by the signal at the first frequency containing information required for the reception of the data/control signal of the signal at the second frequency, the reception decoding operation attempted on the signal at the first frequency can be partially omitted, thus contributing to a low power consumption for the reception of the signal at the first frequency.

(iii) Part of the data/control signal received by the second frequency signal (For example, a portion of one DCI is received by a first frequency signal and the remainder of that DCI is received by a second frequency signal)

In this way, the number of received bits in the second frequency signal can be reduced, so that the signal can be transmitted with less energy, and a lower power consumption can be expected in the receiver.

In addition, the first frequency signal may have the following features (absolute features).

Signal received by a receiver that does not have an FFT on the receiving side or that does not perform parallel-serial conversion on the receiving side Signal that does not consume power when detecting the received signal Signal that does not perform demodulation by reference signal for demodulation (DMRS)

Alternatively, the signal of the first frequency may have the following features (relative features) in comparison with the signal of the second frequency.

Signals with small FFT size (number of FFT points) on the receiving side

Signals with small received bandwidth

Signals with small (or large) SCS

Signals with small (or large) carrier frequencies

Signals whose power consumption is smaller than that of the second receiver when the received signal is detected Received signals of narrow band (low sampling rate) (reception method with lower power consumption compared to received signals of wide band (high sampling rate))

Received signals of lower (or higher) index of signal (time/frequency resource) at different time (/frequency) resource than second frequency signal In addition, each receiver may also be read as a signal of each frequency in the operation example 1~3 described above.

(5.5) Operation Example 5

The example operation described above may similarly be applied to the Paging monitoring operation in idle mode (Specifically, RRC_IDLE) of the UE 200.

Specifically, the UE 200 may receive information/instruction/control signals related to Paging monitoring/reception using a first receiver (or first frequency signal).

Figure 21:
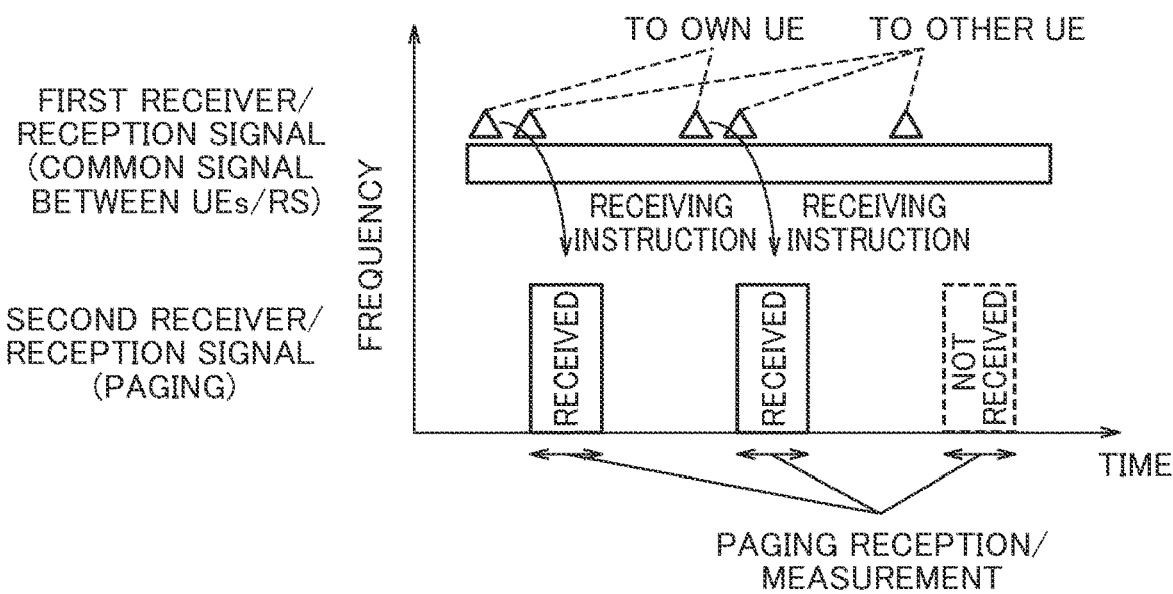
FIG. 21 is a diagram showing examples of power consumption and the reception period of the first receiver (first frequency signal) and the second receiver (second frequency signal) in operation example 5.

FIG. 21 shows examples of power consumption and reception period of the first receiver (first frequency signal) and the second receiver (second frequency signal) in operation example 5.

Features related to paging for the UE 200 may be expressed as follows: The features may be similarly applied to the operation example described above.

The first receiver (or first frequency signal) may receive a common signal/RS (Reference Signal) or a cell specific signal/RS of a UE group, but not a UE specific.

In this case, the UE 200 may be set/notified in advance with information identifying the measurement resource (time/frequency/code/cyclic shift/sequence, etc.) of the received signal/RS by a control signal or the like in the upper layer.

The UE 200 may also be set in advance with information identifying the signal/RS to its own device (its own UE) by a control signal or the like in the upper layer after demodulating/decoding/detecting/receiving/measuring/monitoring the received signal/RS.

The UE 200 uses this information to identify the signal to its own UE (the first control signal, which may be called the first received signal) from among the common signal/RS of the UE group received via the first receiver (or the signal of the first frequency) or the cell-specific/RS. Similarly, the UE 200 may receive information/instructions/control contents regarding the reception of the data/control signal/paging channel received via the second receiver (or the signal of the second frequency or paging) using the first control signal.

A UE individual radio network temporary identifier (RNTI) (For example, C-RNTI) is set in advance as a method to identify the signal/RS to its own UE, and the information bit sequence that demodulates and decodes the signal scrambled by CRC using the UE individual RNTI passes the CRC check. It may be determined that the signal is to its own UE (similar to blind detection of PDCCH).

FIG. 21 shows an example in which only the signal addressed to the own UE affects the reception of the second receiver (received signal). In FIG. 21, the UE 200 determines whether or not the second receiver/received signal (paging) can be measured/received based on the reception result of the first receiver/received signal addressed to the own UE.

In FIG. 21, the second receiver/received signal (paging) is received if a reception instruction is received by the first receiver/received signal addressed to the own UE, and the second receiver/received signal (paging) is not received unless a reception instruction is received by the first receiver/received signal addressed to the own UE. Furthermore, the UE 200 does not determine whether or not the measurement/reception of the second receiver/received signal (paging) is permitted by the terminal based on the reception result of the first receiver/received signal addressed to the other UE.

Although FIG. 21 illustrates a case in which a reception instruction is received by the first receiver/received signal addressed to the own UE, if a non-reception instruction is received by the first receiver/received signal addressed to the own UE, the measurement/reception of the second receiver/ received signal (paging) is not permitted, and if a non-reception instruction is not received by the first receiver/ received signal addressed to the own UE, the measurement/ reception of the second receiver/received signal (paging) may be permitted. Also, FIG. 21 illustrates a method in advance in which the UE 200 determines whether or not paging is received during the set/specified paging reception/ measurement period, but it may be applied without limiting to the paging reception/measurement period.

(6) Operational Effects

According to the above embodiment, the following working effects can be obtained. Specifically, in the UE 200, the first receiver can receive a first control signal containing at least either information, instructions or controls on a second control signal or data received by the second receiver.

Thus, reception/decoding operations and the like in the first receiver can be suppressed, and in particular, power consumption accompanying the reception of control signals such as PDCCH received by the first receiver can be further reduced. Moreover, since it is not necessary to shorten the period for monitoring control signals such as PDCCH, the increase in communication delay can also be avoided. That is, according to the UE 200, power consumption accompanying the reception of control signals such as PDCCH can be further reduced while avoiding the increase in communication delay.

In this embodiment, the first control signal received by the first receiver may include at least either information, instructions or controls regarding the second control signal or data received by the second receiver. This suppresses reception/ decoding operations and the like in the first receiver, which may contribute to further lower power consumption.

In this embodiment, the first receiver may continuously receive the first control signal and the second receiver may intermittently receive the second control signal. This further suppresses reception/decoding operations and the like in the first receiver, which may contribute to further lower power consumption.

In this embodiment, the frequency band to which the first control signal is allocated may be narrower than the frequency band to which the second control signal or data is allocated. This reduces the frequency band targeted by the receiving/decoding operation in the first receiver, which may contribute to further lower power consumption.

In this embodiment, the first receiver may be used for a supplemental downlink (SDL) that supplements the DL received by the second receiver. Thus, the SDL can be flexibly applied while reducing the receiving power consumption.

In this embodiment, the first and second control signals may be used for paging in the idle mode (Specifically, RRC_IDLE) of the UE 200. Thus, paging to the UE 200 can be performed more reliably while reducing the received power consumption.

In this embodiment, the UE 200 (control unit) can control the reception of the second control signal or data based on the first control signal containing at least either information, instructions or controls regarding the second control signal or data. Therefore, as described above, power consumption associated with the reception of control signals such as PDCCH can be further reduced while avoiding an increase in communication delay.

In this embodiment, the size (number of FFT points) of the FFT applied to the first control signal may be smaller than the FFT size applied to the second control signal. This can further reduce power consumption for receiving the first control signal.

In this embodiment, the subcarrier spacing (SCS) applied to the first control signal may be different from the subcarrier spacing applied to the second control signal. The carrier frequency applied to the first control signal may be different from the carrier frequency applied to the second control signal. Thus, if the SCS applied to the first control signal and the carrier frequency are set appropriately, further power consumption reduction in the reception of the first control signal can be achieved.

(7) Other Embodiments

Although the above description of the embodiment is not limited to the description of the embodiment, it is obvious to those skilled in the art that various modifications and improvements are possible.

For example, in the above embodiment, the term receiver was used, but the receiver may be expressed as receiver, receiving unit, reception unit, communication device, communication unit, communication department, etc.

In addition, the block diagram (FIG. 2, FIG. 3A, FIG. 3B) used to explain the above embodiment shows a block for each functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that makes transmission work is called a transmitting unit (transmission unit) or transmitter. In either case, as described above, the implementation method is not particularly limited.

Figure 22:
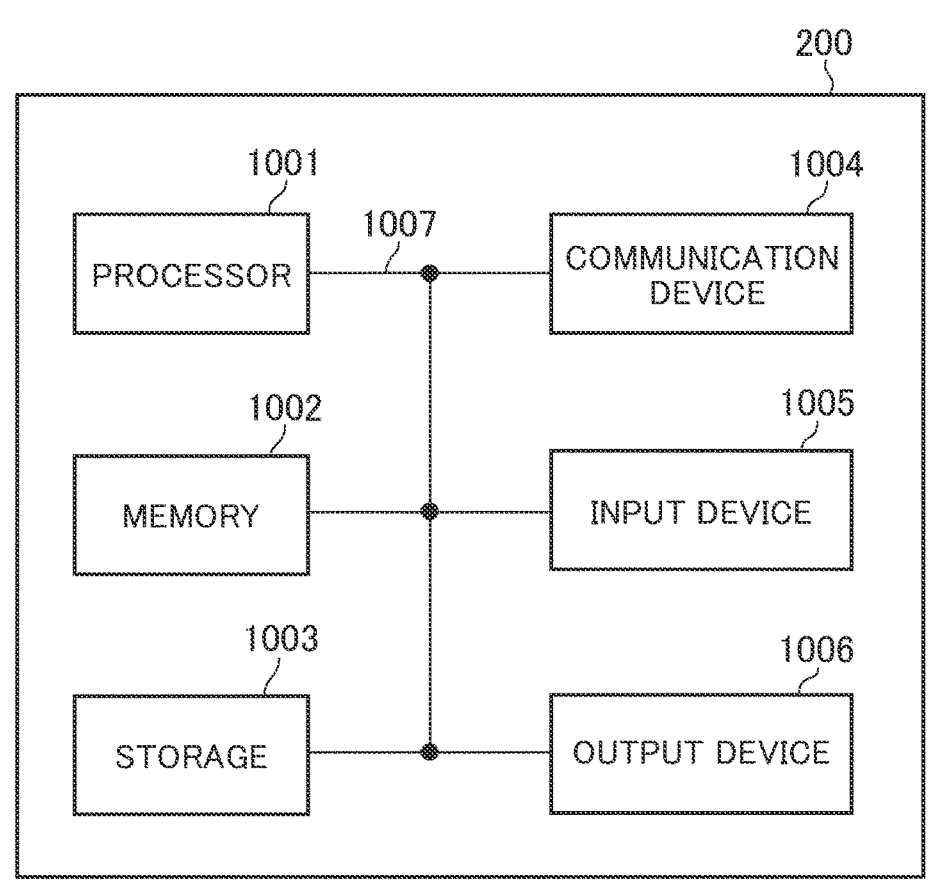
FIG. 22 is a diagram showing an example of the hardware configuration of the UE 200.

Furthermore, the UE 200 described above may function as a computer that performs processing of the radio communication method of this disclosure. FIG. 22 shows an example of the hardware configuration of the UE 200. As shown in FIG. 22, the UE 200 may be configured as a computer device including a processor 1001, a memory 1002, a storage 1003, an communication device 1004, an input device 1005, an output device 1006 and a bus 1007, etc.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block (See FIGS. 2, 3A and 3B) of the UE 200 is realized by any hardware element of the computer device or a combination of the hardware elements.

In addition, each function in the UE 200 is realized by reading prescribed software (programs) on hardware such as the processor 1001, the memory 1002, etc., so that the processor 1001 performs operations and controls communication by communication device 1004 or at least one of reading and writing data in the memory 1002 and the storage 1003.

The processor 1001 controls the entire computer by, for example, operating the operating system. The processor 1001 may consist of a central processing unit (CPU) including interfaces to peripheral devices, controllers, arithmetic units, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EE-PROM), Random Access Memory (RAM), and the like. The memory 1002 may be called a register, cache, main memory (main memory), etc. The memory 1002 can store programs (program code), software modules, etc., that can execute a method according to one embodiment of this disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device such as a processor 1001 and a memory 1002 is connected by a bus 1007 for communicating information. The bus 1007 may be configured using a single bus or different buses for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

In addition, notification of information is not limited to the mode/embodiment described in this disclosure and may be made using other methods. For example, notification of information may be carried out by physical layer signaling (e.g., Downlink Control Information (DCI), Uplink Control Information (UCI), higher layer signaling (e.g., RRC signaling, Medium Access Control (MAC) signaling, notification information (Master Information Block (MIB), System Information Block (SIB)), other signals or a combination thereof. Also, RRC signaling may be referred to as RRC messages, for example, RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, etc., of each mode/embodiment described in this disclosure may be reordered as long as there is no conflict. For example, the method described in this disclosure uses an illustrative order to present elements of various steps and is not limited to the specific order presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in this disclosure may be used alone, in combination, or switched over as practice progresses. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channels and symbols may be a signal (signaling). Also, the signal may be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)," "user terminal," "user equipment (User Equipment: UE)," "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, airplanes, etc.), an unmanned mobile body (For example, drones, self-driving cars, etc.) or a robot (manned or unmanned). At least one of a base station and a mobile station can be a device that does not necessarily move during the communication operation. For example, at least one of a base station and a mobile station may be an Internet of Things (IoT) device such as a sensor.

The base station in this disclosure may also be read as a mobile station (user terminal, hereinafter the same). For example, each mode/embodiment of this disclosure may be applied to a configuration in which communication between a base station and a mobile station is replaced with communication between multiple mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, mobile stations in this disclosure may be replaced with base stations. In this case, the base station may have the function of the mobile station. A radio frame may be composed of one or more frames in the time domain. Each frame or frames in the time domain may be referred to as a subframe. A subframe may be further configured by one or more slots in the time domain. Subframes may have a fixed length of time (For example, 1 ms) independent of numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. A PDSCH (or PUSCH) transmitted in units of time larger than a minislot may be called a PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the subframes and TTI may be a subframe (1 ms) in an existing LTE, may have a duration shorter than 1 ms (For example, 1-13 symbols), or may have a duration longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. In addition, the number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (SubCarrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be identified by an index of RBs relative to the common reference point of the carrier. PRB may be defined in BWP and numbered within that BWP.

BWP may include UL BWP (UL BWP) and DL BWP (DL BWP). One or a plurality of BWPs may be configured in one carrier for the UE.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected," "coupled," or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access." In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to an element using a designation such as "first," "second," and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include," "including," and variants thereof are intended to be inclusive in a manner similar to the term "comprising." Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" and "determination" may include regarding some action as "judgment" and "determination." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 radio communication system
20 NG-RAN
100 gNB
200 UE
BM beam
1001 processor
1002 memory
1003 storage
1004 communication device
1005 input device
1006 output device
1007 bus

The invention claimed is:

1. A terminal comprising:
a first receiver that receives a first control signal; and
a second receiver that receives a second control signal or data, wherein the first receiver continuously receives the first control signal including at least either information, instruction or control relating to the second control signal or the data received by the second receiver,
wherein the second receiver intermittently receives the second control signal, and
wherein the first control signal includes information indicating that the second control signal is received.

2. The terminal according to claim 1, wherein the first control signal includes information indicating whether or not the second control signal or the data is received, or the period of receiving the second control signal or the data.

3. The terminal according to claim 1, wherein a frequency band to which the first control signal is allocated is narrower than a frequency band to which the second control signal or the data is allocated.

4. The terminal according to claim 1, wherein the first receiver is used for a supplemental downlink that supplements the downlink received by the second receiver.

5. The terminal according to claim 1, wherein the first control signal includes information indicating whether or not the second control signal or the data is received.

6. A radio base station comprising:
a transmission unit that transmits a first control signal to a first receiver of a terminal and a second control signal or data to a second receiver of the terminal,
wherein the first receiver continuously receives the first control signal, and the second receiver intermittently receives the second control signal, and
a control unit that causes the transmission unit to transmit the first control signal including at least either information, instruction or control relating to the second control signal or the data received by the second receiver,
wherein the first control signal includes information indicating that the second control signal is received.

* * * * *